United States Patent
Archer et al.

(10) Patent No.: US 11,047,463 B2
(45) Date of Patent: Jun. 29, 2021

(54) DIFFERENTIAL INPUT SHAFT WITH A TAPERED ROLLER BEARING

(71) Applicant: DANA HEAVY VEHICLE SYSTEMS GROUP, LLC, Maumee, OH (US)

(72) Inventors: Bradley R. Archer, Monclova, OH (US); Jeremy M. Frenznick, Brighton, MI (US); Nicholas W. Laforce, Whitehouse, OH (US); Paul V. Mackalski, Milford, MI (US); Matthew T. Malanga, Bowling Green, OH (US); Jared T. Reichert, Pemberville, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 64 days.

(21) Appl. No.: 16/340,438

(22) PCT Filed: Oct. 12, 2017

(86) PCT No.: PCT/US2017/056337
§ 371 (c)(1),
(2) Date: Apr. 9, 2019

(87) PCT Pub. No.: WO2018/071667
PCT Pub. Date: Apr. 19, 2018

(65) Prior Publication Data
US 2019/0308498 A1 Oct. 10, 2019

Related U.S. Application Data

(60) Provisional application No. 62/408,401, filed on Oct. 14, 2016.

(51) Int. Cl.
*F16H 48/24* (2006.01)
*F16H 48/08* (2006.01)
(Continued)

(52) U.S. Cl.
CPC .............. *F16H 48/24* (2013.01); *B60K 17/36* (2013.01); *F16H 48/08* (2013.01); *F16H 2048/423* (2013.01)

(58) Field of Classification Search
CPC ........... F16H 2048/02–04; F16H 48/05; F16H 48/24; F16H 42/423–2048/423;
(Continued)

(56) References Cited

U.S. PATENT DOCUMENTS 3,916,728 A * 11/1975 Behar ................... F16H 48/22
475/231
4,289,045 A * 9/1981 Brisabois ................. B60K 5/04
475/206

(Continued)

OTHER PUBLICATIONS

European Patent Office, International Search Report and Written Opinion in Application No. PCT/US2017/056337, dated Jan. 22, 2018, 11 pages, Rijswijk Netherlands.

*Primary Examiner* — Ernesto A Suarez
*Assistant Examiner* — James J Taylor, II
(74) *Attorney, Agent, or Firm* — Marshall & Melhorn, LLC

(57) ABSTRACT

An axle system for a vehicle having an input shaft and an input helical gear. Circumferentially extending from at least a portion of an outer surface of an intermediate portion of the input shaft is an increased diameter portion. A bearing journal surface is disposed directly adjacent to a first end portion of the increase diameter portion and a tapered roller bearing journal surface is disposed directly adjacent to a second end portion of the increased diameter portion of the input shaft. Disposed outboard from the bearing journal surface is a bearing and a tapered roller bearing is disposed outboard from the tapered roller bearing journal surface of the input shaft. At least a portion of the tapered roller bearing is disposed with a tapered roller bearing receiving portion
(Continued)

circumferentially extending along at least a portion of an inner surface of an input helical side gear.

17 Claims, 7 Drawing Sheets

(51) Int. Cl.
  *F16H 48/42* (2012.01)
  *B60K 17/36* (2006.01)
(58) Field of Classification Search
  CPC ....... F16H 57/021; F16H 48/08; B60K 17/36; B60K 17/34–3462; B60K 17/16; F16C 19/364; F16C 19/548; F16C 35/06; F16C 2361/61
  See application file for complete search history.

(56) References Cited

U.S. PATENT DOCUMENTS

| | | | |
|---|---|---|---|
| 4,373,604 | A | 2/1983 | Lunn |
| 5,302,158 | A | 4/1994 | Kwasniewski |
| 5,404,963 | A | 4/1995 | Crepas |
| 6,884,196 | B1 | 4/2005 | Ziech |
| 7,211,017 | B2 * | 5/2007 | Green .................. B60K 17/16 |
| | | | 192/85.18 |
| 7,762,725 | B2 | 7/2010 | Fahrni, Jr. |
| 8,176,811 | B2 | 5/2012 | Peterson |
| 8,651,994 | B2 | 2/2014 | Bassi |
| 9,381,806 | B2 | 7/2016 | Tavvala |
| 2005/0026734 | A1 * | 2/2005 | Ziech .................. F16H 57/023 |
| | | | 475/246 |
| 2005/0113204 | A1 | 5/2005 | Wenstrup |
| 2005/0247148 | A1 | 11/2005 | Slesinski |

* cited by examiner

DIFFERENTIAL INPUT SHAFT WITH A TAPERED ROLLER BEARING

CROSS REFERENCE TO RELATED APPLICATIONS

The present application claims the benefit to U.S. Provisional Patent Application No. 62/408,401 filed on Oct. 14, 2016, which is incorporated herein by reference in its entirety.

FIELD OF THE DISCLOSURE

The present disclosure relates to a differential assembly having a differential input shaft with a tapered roller bearing.

BACKGROUND OF THE DISCLOSURE

Many vehicles employ the use of one or more differential assemblies to divide the rotational power generated by an engine of a vehicle between the axles allowing the outer drive wheel(s) to rotate at a faster rate than the inner drive wheel(s). Vehicles utilizing multiple drive axle systems typically include the use of an inter-axle differential that is located in a forward tandem axle system to distribute the power generated by the engine either proportionately or disproportionately between the axles of the vehicle.

In order to transfer the rotational power generated by the engine to the inter-axle differential, an inter-axle differential input shaft is used. The inter-axle differential includes an input helical side gear that is rotatably supported on the inter-axle differential input shaft. Conventional input helical side gears are rotationally supported on the inter-axle differential input shaft by using one or more bushings that are interposed between an inner surface of the input helical side gear and an outer surface of the inter-axle differential input shaft. The one or more bushings interposed between the outer surface of the inter-axle differential input shaft and the inner surface of the input helical side gear provide radial support for the input helical side gear. Additionally, conventional inter-axle differential systems require the use of an additional thrust bearing or a thrust washer to axially support the input helical side gear.

The need to use a thrust washer and one or more bushings to fully rotationally support the input helical side gear on the inter-axle differential input shaft adds unnecessary expense and complexity to both the assembly and the manufacturing of the inter-axle differential system. It would therefore be advantageous to develop a way to rotationally support the input helical side gear on the inter-axle differential input shaft using fewer components and making the manufacturing and assembly of the inter-axle differential system more cost efficient.

SUMMARY OF THE DISCLOSURE

An axle system for use in a motor vehicle having an input shaft. The input shaft has an outer surface, a first end portion, a second end portion and an intermediate portion interposed between the first end second end portions of the input shaft. An increased diameter portion having a first end portion and a second end portion circumferentially extends from at least a portion of the intermediate portion of the input shaft.

Disposed directly adjacent to the first end portion of the increased diameter portion of the input shaft is a first tapered roller bearing journal surface. At least a portion of a first tapered roller bearing is disposed radially outboard from and is in direct contact with at least a portion of the first tapered roller bearing journal surface of the input shaft.

A second tapered roller bearing journal surface is disposed directly adjacent to the second end portion of the increased diameter portion of the input shaft. At least a portion of a second tapered roller bearing is disposed radially outboard from and is in direct contact with at least a portion of the second tapered roller bearing journal surface of the input shaft.

An input helical side gear having a first end portion, a second end portion, an inner surface and an outer surface is in direct contact with at least a portion of the second tapered roller bearing. Circumferentially extending along at least a portion of the first end portion of the inner surface of the input helical side gear is a tapered roller bearing receiving portion. At least a portion of the second tapered roller bearing is disposed within the tapered roller bearing receiving portion in the inner surface of the input helical side gear.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the differential assembly disclosed herein may be used in automotive, off-road vehicle, all-terrain vehicle, construction, structural, marine, aerospace, locomotive, military, machinery, robotic and/or consumer product applications. Additionally, as a non-limiting example, the differential assembly disclosed herein may also be used in passenger vehicle, electric vehicle, hybrid vehicle, commercial vehicle and/or heavy vehicle applications.

Figure 1:
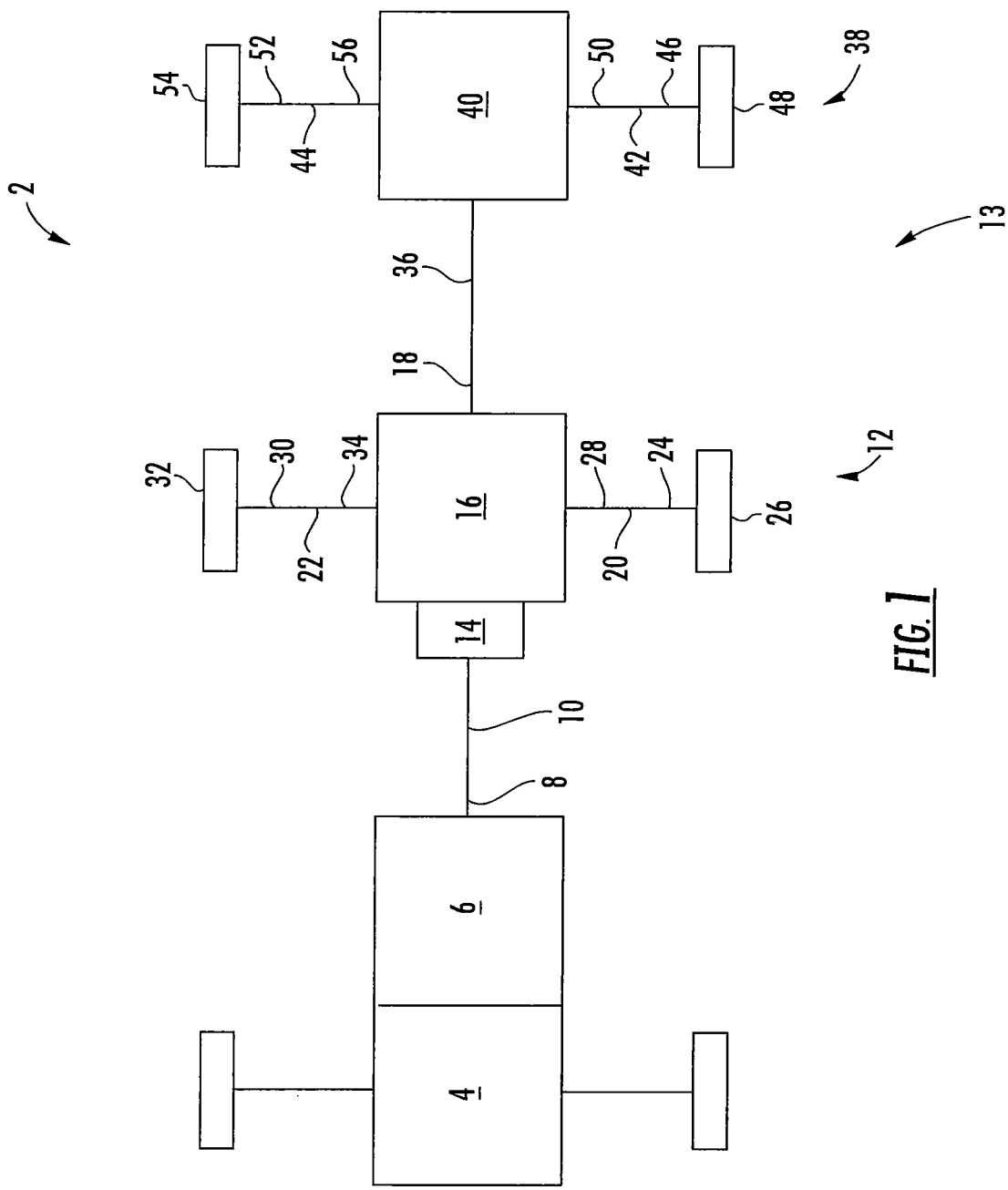
FIG. 1 is a schematic top-plan view of a vehicle having an axle assembly according to an embodiment of the disclosure.

FIG. 1 schematically illustrates a vehicle 2 having a tandem rear axle assembly according to an embodiment of the disclosure. The vehicle 2 has an engine 4 which is drivingly connected to a transmission 6. A transmission output 8 shaft is then drivingly connected to the end of the transmission 6 opposite the engine 4. The transmission 6 is a power management system which provides controlled application of the rotational power provided by the engine 2 by means of a gearbox.

A first propeller shaft 10 extends from the transmission output shaft 8 and drivingly connects the transmission 6 to a forward tandem axle system 12 of a tandem axle system 13 having an inter-axle differential 14. As illustrated in FIG. 1 of the disclosure, an end of the first propeller shaft 10, opposite the transmission output shaft 8, is connected to the inter-axle differential 14 of the forward tandem axle system 12. It is within the scope of this disclosure that the end of the first propeller shaft 10, opposite the transmission output shaft 8, may be connected to the inter-axle differential 14 by using one or more of the following components (not shown), a drive shaft, a stub shaft, a coupling shaft, a forward tandem axle system input shaft, a pinion gear input shaft, an inter-axle differential input shaft and/or an inter-axle differential pinion shaft. The inter-axle differential 14 is a device that divides the rotational power generated by the engine 2 between the axles in the vehicle 2.

As illustrated in FIG. 1, the inter-axle differential 14 is drivingly connected to a forward tandem axle differential 16 and a forward tandem axle output shaft 18. The forward tandem axle differential 16 is a set of gears that allows the outer wheel(s) if a wheeled vehicle 2 to rotate at a faster rate than the inner drive wheel(s). The rotational power is transmitted through the forward tandem axle system 12 as described in more detail below.

The forward tandem axle system 12 further includes a first forward tandem axle half shaft 20 and a second forward tandem axle half shaft 22. The first forward tandem axle half shaft 20 extends substantially perpendicular to the first propeller shaft 10. A first end portion 24 of the first forward tandem axle half shaft 20 is drivingly connected to a first forward tandem axle wheel assembly 26 and a second end portion 28 of the first forward tandem axle half 20 shaft is drivingly connected to a side of the forward tandem axle differential 16. As a non-limiting example, the second end portion 28 of the first forward tandem axle half shaft 20 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the first propeller shaft 10 is the second forward tandem axle half shaft 22. A first end portion 30 of the second forward tandem axle half shaft 22 is drivingly connected to a second forward tandem axle wheel assembly 32. A second end portion 34 of the second forward tandem axel half shaft 22 is drivingly connected to a side of the forward tandem axle differential 16 opposite the first forward tandem axle half shaft 20. As a non-limiting example, the second end portion 34 of the second forward tandem axle half shaft 22 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle output shaft 18 is drivingly connected to a side of the inter-axle differential 14 opposite the first propeller shaft 10. Drivingly connected to an end of the forward tandem axle output shaft 18, opposite the inter-axle differential 14, is a second propeller shaft 36. The second propeller shaft 36 extends from the forward tandem axle system 12 to a rear tandem axle system 38 of the tandem axle system 13 of the vehicle 2. An end of the second propeller shaft 36, opposite the forward tandem axle output shaft 18, is drivingly connected to a rear tandem axle differential 40 of the rear tandem axle system 38. It is within the scope of this disclosure and as a non-limiting example that the second propeller shaft 36 may be connected to the rear tandem axle differential 40 through one or more of the following (not shown) a drive shaft, a propeller shaft, a stub shaft, a coupling shaft, a rear tandem axle system input shaft, a pinion gear shaft and/or a rear tandem axle differential input shaft. The rear tandem axle differential 40 is a set of gears that allows the outer drive wheel(s) of a wheeled vehicle 2 to rotate at a faster rate than the inner drive wheel(s). The rotational power is transmitted through the rear tandem axle system 38 as described in more detail below.

The rear tandem axle system 38 further includes a first rear tandem axle half shaft 42 and a second rear tandem axle half shaft 44. The first rear tandem axle half shaft 42 extends substantially perpendicular to the second propeller shaft 36. A first end portion 46 of the first rear tandem axle half shaft 42 is drivingly connected to a first rear tandem axle wheel assembly 48 and a second end portion 50 of the first rear tandem axle half shaft 42 is drivingly connected to a side of the rear tandem axle differential 40. As a non-limiting example, the second end portion 50 of the first rear tandem axle half shaft 42 is drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the second propeller shaft 36 is the second rear tandem axle half shaft 44. A first end portion 52 of the second rear tandem axle half shaft 44 is drivingly connected to a second rear tandem axle wheel assembly 54. A second end portion 56 of the second rear tandem axle half shaft 44 is drivingly connected to a side of the rear tandem axle differential 40 opposite the first rear tandem axle half shaft 42. As a non-limiting example, the second end portion 56 of the second rear tandem axle half shaft 44 is drivingly connected to a rear tandem axle differential side gear, a separate stub shaft, a separate coupling shaft, a second rear tandem axle differential output shaft and/or a shaft that is formed as part of a rear tandem axle differential side gear.

Figure 2:
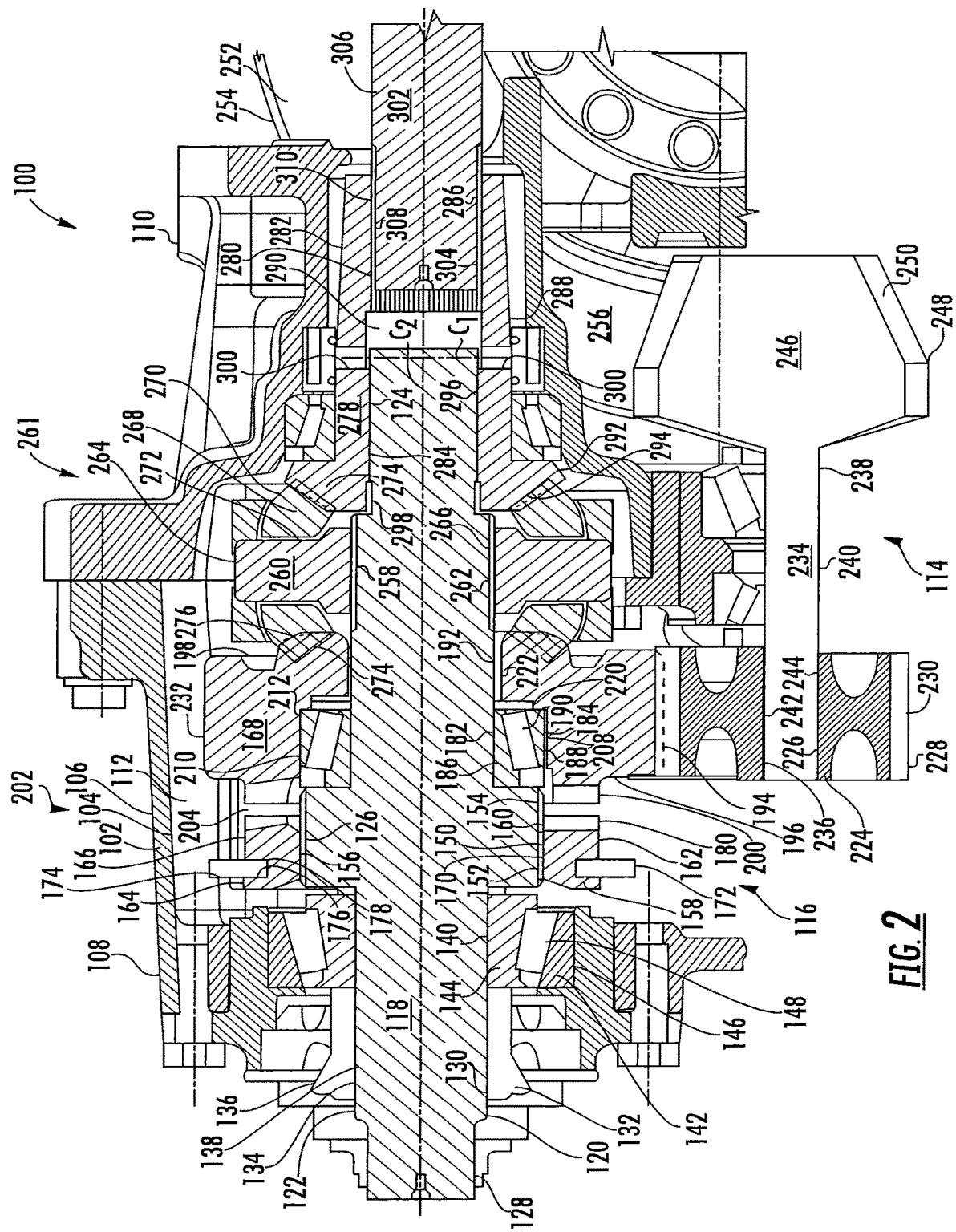
FIG. 2 is a cut-away schematic side-view of a portion of an axle system according to an embodiment of the disclosure having an axle disconnect collar in a first position.
Figure 3:
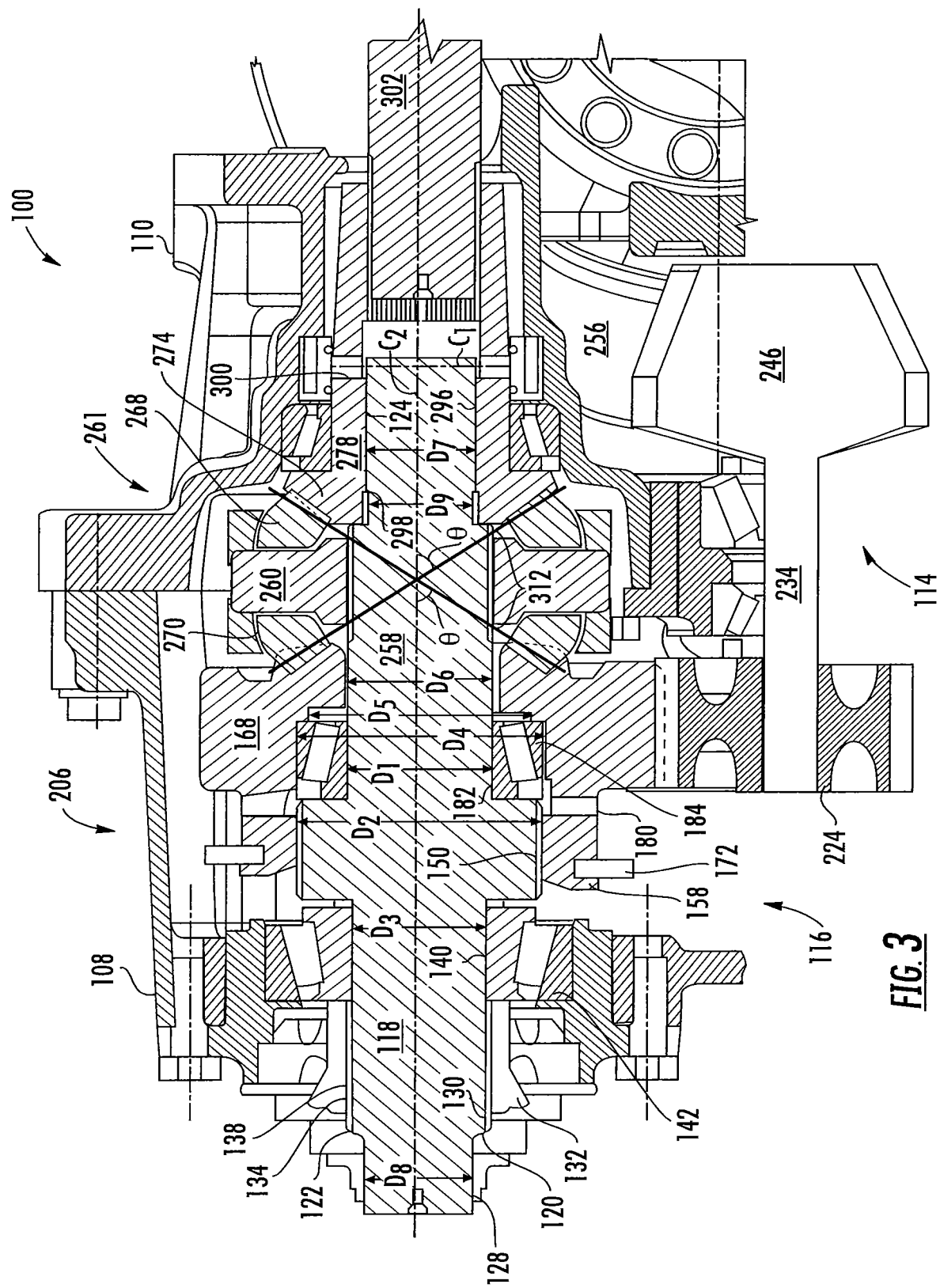
FIG. 3 is a cut-away schematic side-view of a portion of the axle system according to the embodiment of the disclosure illustrated in FIG. 2 where the axle disconnect collar in a second position.

FIGS. 2 and 3 are a cut-away schematic side-view of a portion of an axle system 100 according to an embodiment of the disclosure. As illustrated in FIGS. 2 and 3 of the disclosure, the axle system 100 has a housing 102 having an inner surface 104, an outer surface 106, a first end portion 108 and a second end portion 110. The inner surface 104 and the outer surface 106 defines a hollow portion 112 therein. It is within the scope of this disclosure and as a non-limiting example that the housing 102 may be a unitary housing or made of a plurality of pieces interconnected to one another to form the housing 102 of the axle system 100. According to an embodiment of the disclosure and as a non-limiting example, the axle system 100 is a forward tandem axle system.

As illustrated in FIGS. 2 and 3 of the disclosure, the axle system 100 includes a differential assembly 114 and an inter-axle differential assembly 116 at least partially disposed within the hollow portion 112 of the housing 102. An input shaft 118 having an outer surface 120, a first end portion 122, a second end portion 124 and an intermediate portion 126 interposed between the first and second end portion 122 and 124 of the input shaft 118 is drivingly connected to the differential assembly 114 and the inter-axle differential assembly 116 of the axle system 100. The input shaft 118 takes the rotational power generated by a source of rotational power (not shown) and transmits the rotational power generated to the inter-axle differential assembly 116 and the differential assembly 114 of the axle system 100. In accordance with an embodiment of the disclosure and as a non-limiting example, the input shaft 118 is a differential input shaft, a tandem axle input shaft, a forward tandem axle input shaft and/or an inter-axle differential input shaft.

According to the embodiment of the disclosure illustrated in FIGS. 2 and 3 and as a non-limiting example, the first end portion 122 of the input shaft 118 has a first reduced diameter portion 128. In accordance with the embodiment of the disclosure illustrated in FIGS. 2 and 3 and as a non-limiting example, at least a portion of the first end portion 122 and the first reduced diameter portion 128 of the input shaft 118 extends outside housing 102 of the axle system 100.

Circumferentially extending from at least a portion of the outer surface 120 of at least a portion of the first end portion 122 of the input shaft 118 is a first plurality of axially extending input shaft splines 130. The first plurality of axially extending input shaft splines 130 on the outer surface 120 of the first end portion 122 of the input shaft 118 are disposed directly adjacent to and axially inboard from the first reduced diameter portion 128 of the first end portion 122 of the input shaft 118. According to an embodiment of the disclosure, at least a portion of the first plurality of axially extending input shaft splines 130 on the outer surface 120 of the first end portion 122 of the input shaft 118 extend outside the housing 102 of the axle system 100.

Extending co-axially with the input shaft 118 of the axle system 100 is a component 132 having an inner surface 134 and an outer surface 136. Circumferentially extending along at least a portion of the inner surface 134 of the component 132 is a plurality of axially extending coupling component splines 138. The plurality of axially extending coupling component splines 138 are complementary to and meshingly engaged with the first plurality of axially extending input shaft splines 130 on the first end portion 122 of the input shaft 118. It is within the scope of this disclosure that the component 132 may be any component that is capable of transmitting the rotational power generated by the source of rotational power (not shown) to the input shaft 118 of the axle system 100. As a non-limiting example, the component 132 of the axle system 100 may be a propeller shaft, a drive shaft, a coupling shaft, a stub shaft, a forward tandem axle system input shaft, an output end of a universal joint, an output end of a constant velocity joint, an output end of a U-joint, an output end of a cardan joint and/or an output end of a double cardan joint.

Disposed axially inboard from the first reduced diameter portion 128 and the first plurality of axially extending input shaft splines 130 is a first tapered roller bearing journal surface 140. According to the embodiment of the disclosure illustrated in FIGS. 2 and 3 and as a non-limiting example, the first tapered roller bearing journal surface 140 is disposed directly adjacent to and axially inboard from the first plurality of axially extending input shaft splines 130. In accordance with an embodiment of the disclosure and as a non-limiting example, at least a portion of the first tapered roller bearing journal surface 140 of the input shaft 118 may be machined, polished and/or coated with a material so as to reduce the amount of friction between the input shaft 118 and the first tapered roller bearing 142. Additionally, it is within the scope of this disclosure that at least a portion of the first tapered roller bearing journal surface 140 may be heat treated by using one or more heat treating processes. By machining, polishing, coating and/or heat treating at least a portion of the first tapered roller bearing journal surface 140 it aids in increasing the overall-life, efficiency and durability of the axle system 100.

A first tapered roller bearing 142 is disposed radially outboard from and extends co-axially with the input shaft 118 of the axle system 100. At least a portion of the first tapered roller bearing 142 is in direct contact with at least a portion of the first tapered roller bearing journal surface 140 of the input shaft 118. The first tapered roller bearing 142 has an inner race 144, an outer race 146 and one or more rolling elements 148 interposed between the inner race 144 and the outer race 146 of the first tapered roller bearing 142. According to the embodiment of the disclosure illustrated in FIG. 2, at least a portion of an inner most surface of the inner race 144 of the first tapered roller bearing 142 is in direct contact with at least a portion of the first tapered roller bearing journal surface 140 of the input shaft 118. Additionally, according to the embodiment of the disclosure illustrated in FIG. 2, at least a portion of the outer race 144 is in direct contact with at least a portion of the inner surface 104 of the housing 102 of the axle system 100. It is therefore within the scope of this disclosure that the first tapered roller bearing 142 is used to provide rotational support for the input shaft 118 within the housing 102 of the axle system 100.

An increased diameter portion 150 having a first end portion 152 and a second end portion 154 is disposed directly axially inboard from the first reduced diameter portion 128, the first plurality of axially extending input shaft splines 130 and the first tapered roller bearing journal surface 140 of the input shaft 118. According to the embodiment of the disclosure illustrated in FIGS. 2 and 3 and as a non-limiting example, the increased diameter portion 150 of the input shaft 118 is disposed directly adjacent to and axially inboard from the first tapered roller bearing journal surface 140 and the first tapered roller bearing 142 of the axle system 100. Additionally, according to the embodiment of the disclosure illustrated in FIG. 2 and as a non-limiting example, at least a portion of the inner race 144 of the first tapered roller bearing 142 is in first contact with a least a portion of the first end portion 152 of the increased diameter portion 150 of the input shaft 118. Circumferentially extending from at least a portion of the outer surface 120 of the increased diameter portion 150 of the input shaft 118 is a second plurality of axially extending input shaft splines 156.

Extending co-axially with and disposed radially outboard from at least a portion of the increased diameter portion 150 of the input shaft 118 an axle disconnect collar 158 having an inner surface 160, an outer surface 162, a first end portion 164 and a second end portion 166. The axle disconnect collar 158 is selectively engageable with an input helical side gear 168. Circumferentially extending along at least a portion of the inner surface 160 of the axle disconnect collar 158 is a plurality of axially extending axle disconnect collar splines 170. As best seen in FIG. 2 of the disclosure, the plurality of axially extending axle disconnect collar splines 170 are complementary to and meshingly engaged with the second plurality of axially extending input shaft splines 156 on the increased diameter portion 150 of the input shaft 118. This will allow the axle disconnect collar 158 to be slidingly engaged with the increased diameter portion 150 of the input shaft 118 of the axle system 100.

Disposed at least partially radially outboard from the axle disconnect collar 158 is a shift fork 172 having a first end portion 174 and a second end portion 176. At least a portion of a first end portion 174 of the shift fork 172 is drivingly connected to an actuation assembly (not shown). It is within the scope of this disclosure and as a non-limiting example that the actuation assembly (not shown) may be a linear actuator assembly, a pneumatic actuator assembly and/or an electromechanical actuator assembly. In accordance with the embodiment of the disclosure illustrated in FIGS. 2 and 3 and as a non-limiting example, at least a portion of the second end portion 176 of the shift fork 172 is disposed within a shift fork groove 178 circumferentially extending along at least a portion of the outer surface 162 of the axle disconnect collar 158.

Circumferentially extending axially outboard from at least a portion of the second end portion 166 of the axle disconnect collar 158 is a plurality of axle disconnect collar clutch teeth 180. According to the embodiment of the disclosure illustrated in FIGS. 2 and 3 of the disclosure and as a non-limiting example, the plurality of axle disconnect collar clutch teeth 180 are a plurality of dog clutch teeth. In accordance with an alternative embodiment of the disclosure (not shown) and as a non-limiting example, the plurality of axle disconnect collar clutch teeth 180 are a plurality of face clutch teeth or a plurality of friction clutch teeth.

Disposed axially inboard from the first reduced diameter portion 128, the first plurality of axially extending input shaft splines 130, the first tapered roller bearing journal surface 140 and the increased diameter portion 150 of the input shaft 118 is a second tapered roller bearing journal surface 182. In accordance with the embodiment of the disclosure illustrated in FIGS. 2 and 3 and as a non-limiting example, the second tapered roller bearing journal surface 182 is disposed directly adjacent to and axially inboard from the second end portion 154 of the increased diameter portion 150 of the input shaft 118 of the axle system 100. It is within the scope of this disclosure and as a non-limiting example, that the second tapered roller bearing journal surface 182 of the input shaft 118 may be machined, polished and/or coated with a material so as to reduce the amount of friction between the input shaft 118 and a second tapered roller bearing 184. Additionally, it is within the scope of this disclosure and as a non-limiting example that at least a portion of the second tapered roller bearing journal surface 182 may be heat treated by using one or more hear treating processes. By machining, polishing, coating and/or heat treating at least a portion of the second tapered roller bearing journal surface 182 it aids in increasing the overall-life, efficiency and durability of the axle system 100.

As best seen in FIG. 3 of the disclosure and as a non-limiting example, the second tapered roller bearing journal surface 182 has a diameter D1 that is less than a diameter D2 of the increased diameter portion 150 of the input shaft 118. In accordance with the embodiment of the disclosure illustrated in FIG. 3 and as a non-limiting example, the diameter D1 of the second tapered roller bearing journal surface 182 is greater than a diameter D3 of the first tapered roller bearing journal surface 140. While the second tapered roller bearing journal surface 182 illustrated in FIG. 3 has a diameter D1 that is greater than the diameter D3 of the first tapered roller bearing journal surface 140, it is within the scope of this disclosure that the diameter D3 of the first tapered roller bearing journal surface 140 may be substantially equal to or greater than the diameter D1 of the second tapered roller bearing journal surface 182 of the input shaft 118.

The second tapered roller bearing 184 is disposed radially outboard from and extends co-axially with the input shaft of the axle system 100. As illustrated in FIGS. 2 and 3 of the disclosure, at least a portion of the second tapered roller bearing 184 is in direct contact with the second tapered roller bearing journal surface 182 of the input shaft 118. The second tapered roller bearing 184 of the axle system 100 has an inner race 186, an outer race 188 and one or more rolling elements 190 interposed between the inner race 186 and the outer race 188 of the second tapered roller bearing 184. In accordance with the embodiment of the disclosure illustrated in FIG. 2, at least a portion of an inner most surface of the inner race 186 of the second tapered roller bearing 184 is in direct contact with at least a portion of the second tapered roller bearing journal surface 182 of the input shaft 118. Additionally in accordance with the embodiment of the disclosure illustrated in FIG. 2 and as a non-limiting example, at least a portion of the inner race 186 is in direct contact with at least a portion of the second end portion 154 of the increased diameter portion 150 of the input shaft 118.

Extending co-axially with the input shaft 118 of the axle system 100 is the input helical side gear 168 having an inner surface 192, an outer surface 194, a first end portion 196 and a second end portion 198. As illustrated in FIGS. 2 and 3 of the disclosure, at least a portion of the input helical side gear 168 is disposed radially outboard from at least a portion of the intermediate portion 126 of the input shaft 118, the second tapered roller bearing 184 and/or the increased diameter portion 159 of the input shaft 118 of the axle system 100. Circumferentially extending axially outboard from at least a portion of the first end portion 196 of the input helical side gear 168 is a plurality of input helical side gear clutch teeth 200. The plurality of input helical side gear clutch teeth 200 are complementary to and selectively engageable with the plurality of axle disconnect collar clutch teeth 180 on the second end portion 166 of the axle disconnect collar 158. According to the embodiment of the disclosure illustrated in FIGS. 2 and 3 of the disclosure and as a non-limiting example, the plurality of input helical side gear clutch teeth 200 are a plurality of dog clutch teeth. In accordance with an alternative embodiment of the disclosure (not shown) and as a non-limiting example, the plurality of input helical side gear clutch teeth 200 are a plurality of face clutch teeth or a plurality of friction clutch teeth.

When the axle disconnect collar 158 is in the position illustrated in FIG. 2 of the disclosure, the axle disconnect collar 158 is in a first position 202. As best seen in FIG. 2 of the disclosure, when the axle disconnect collar 158 is in the first position 202, the plurality of axle disconnect collar clutch teeth 180 on the second end portion 166 of the axle disconnect collar 158 are not meshingly engaged with the plurality of input helical side gear clutch teeth 200 on the first end portion 196 of the input helical side gear 168 defining a gap 204 therebetween. When in the first position 202 illustrated in FIG. 2, the differential assembly 114 of the axle system 100 is disconnected from the input shaft 118 of the axle system 100. As a result, when the axle disconnect collar 158 is in the first position 202, the amount rotational power transmitted from the input shaft 118 to the differential assembly 114 is equal to the amount of rotational power transmitted from the input shaft 118 to a rear tandem axle system (not shown).

When the axle disconnect collar 158 is in the position illustrated in FIG. 3 of the disclosure, the axle disconnect collar 158 is in a second position 206. As best seen in FIG. 3 of the disclosure, when the axle disconnect collar 158 is in the second position 206, the plurality of axle disconnect collar clutch teeth 180 on the second end portion 166 of the axle disconnect collar 158 are meshingly engaged with the plurality of input helical side gear clutch teeth 200 on the first end portion 196 of the input helical side gear 168. When in the second position 206 illustrated in FIG. 3, the differential assembly 114 of the axle system 100 is drivingly connected to the input shaft 118 of the axle system 100. As a result, when the axle disconnect collar 158 is in the second position 206, the amount of rotational power transmitted from the input shaft 118 to the differential assembly 114 is not equal to the amount of rotational power transmitted from the input shaft 118 to the rear tandem axle system (not shown).

In order to drive the axle disconnect collar 158 from the first position 202 illustrated in FIG. 2 to the second position 206 illustrated in FIG. 3, the actuation assembly (not shown) drives the shift fork 172 axially toward the input helical side gear 168 which in turn drives the axle disconnect collar 158 axially toward and into engagement with the input helical side gear 168 of the axle system 100. As a result, the actuation assembly (not shown) provides the force needed to selectively transmitted the axle disconnect collar 158 between the first position disengaged position 202 illustrated in FIG. 2 and the second engaged position 206 illustrated in FIG. 3 of the disclosure.

Circumferentially extending along at least a portion of the first end portion 196 of the inner surface 192 of the input helical side gear 168 is a tapered roller bearing receiving portion 208 having a first end portion 210 and a second end portion 212. The tapered roller bearing receiving portion 208 of the input helical side hear 168 of the axle system 100 is of a size and shape to receive and/or retain at least a portion of the second tapered roller bearing 184 therein. As a result, the tapered roller bearing receiving portion 208 has a diameter D4 that is substantially equal to or slightly greater than an outer diameter of the outer race 188 of the second tapered roller bearing 184. In accordance with the embodiment of the disclosure illustrated in FIG. 2 and as a non-limiting example, at least a portion of the outer race 188 of the second tapered roller bearing 184 is in direct contact with at least a portion of the tapered roller bearing receiving portion 208 of the input helical side hear 168. As illustrated in FIGS. 2 and 3 of the disclosure, the second tapered roller bearing 184 provides rotational support for at least a portion of the input helical side gear 168 and allows for relative rotation between the input shaft 118 and the input helical side gear 168 and the axle system 100.

Disposed directly adjacent to the second end portion 212 of the tapered roller bearing receiving portion 208 of the input helical side gear 168 is a tapered roller bearing locator portion 220. As best seen in FIG. 2 of the disclosure, the tapered roller bearing receiving portion 208 circumferentially extends along at least a portion of the inner surface 192 of the input helical side gear 168 of the axle system 100. The tapered roller bearing locator portion 220 in the inner surface 192 of the input helical side gear 168 ensures that the second tapered roller bearing 184 is assembled in the correct location in relation the input shaft 118 and the input helical side gear 168. Additionally, the tapered roller bearing locator portion 220 in the inner surface 192 of the input helical side gear 168 ensures that the second tapered roller bearing 184 remains in the correct location with respect to input shaft 118 and the input helical side gear 168 when in operation. In accordance with the embodiment of the disclosure illustrated in FIG. 2 and as a non-limiting example, at least a portion of the outer race 188 of the second tapered roller bearing 184 is in direct contact with at least a portion of the tapered roller bearing locator portion 220 in the inner surface 192 of the input helical side gear 168 of the axle system 100. As best seen in FIG. 3 of the disclosure and as a non-limiting example, the tapered roller bearing locator portion 220 of the input helical side gear 168 has a diameter D5 that is less than the diameter D4 of the tapered roller bearing receiving portion 208 of the input helical side gear 168.

Circumferentially extending along at least a portion of the inner surface 192 of the input helical side gear 168 is a lubricant flow portion 222. As best seen in FIG. 2 of the disclosure, the lubricant flow portion 222 in the inner surface 192 of the input helical side gear 168 is disposed directly adjacent to an end of the tapered roller bearing locator portion 220 opposite the tapered roller bearing receiving portion 208 of the input helical side gear 168. The lubricant flow portion 222 of the input helical side gear 168 allows for the flow of an amount of lubricant fluid through the axle system 100 in order to ensure that the various components of the axle system 100 remain properly lubricated when in operation. In accordance with the embodiment of the disclosure illustrated in FIG. 3 and as a non-limiting example, the lubricant flow portion 222 in the inner surface 192 of the input helical side gear 168 has a diameter D6 that is less than the diameter D5 of the tapered roller bearing locator portion 220 and the diameter D4 of the tapered roller bearing receiving portion 208 of the input helical side gear 168.

According to the embodiment of the disclosure illustrated in FIGS. 2 and 3 and as a non-limiting example, the inner surface 192 of the input helical side gear 168 includes, in axial order from the first end portion 196 to the second end portion 198 of the input helical side gear 168, the tapered roller bearing receiving portion 208, tapered roller bearing locator portion 220 and the lubricant flow portion 222.

Drivingly connected to the input helical side gear 168 is an intermediate gear 224 having an inner surface 226 and an outer surface 228. Circumferentially extending along at least a portion of the outer surface 228 of the intermediate gear 224 of the axle system 100 is a plurality of intermediate gear teeth 230. The plurality of intermediate gear teeth 230 are complementary to and meshingly engaged with a first plurality of input helical side gear teeth 232 circumferentially extend along at least a portion of the outer surface 194 of the input helical side gear 168.

Extending co-axially with and drivingly connected to the input shaft 118, the input helical side gear 168 and/or the intermediate gear 224 is a differential input shaft 234 having a first end portion 236, a second end portion 238 and an outer surface 240. Circumferentially extending along at least a portion of the outer surface 240 of the first end portion 236 of the differential input shaft 234 is a plurality of axially extending differential input shaft splines 242. The plurality of axially extending differential input shaft splines 242 are complementary to and meshingly engaged with a plurality of axially extending intermediate gear splines 244 circumferentially extending along at least a portion of the inner surface 226 of the intermediate gear 224 of the axle system 100.

Integrally connected to at least a portion of the second end portion 238 of the differential input shaft 234 is a differential pinion gear 246 having an outer surface 248. As a non-limiting example, the differential pinion gear 246 may be integrally connected to at least a portion of the second end portion 238 of the differential input shaft 234 by a spline connection, one or more welds and/or one or more mechanical fasteners. Additionally, as a non-limiting example, the differential pinion gear 246 may be integrally formed as part of the second end portion 238 of the differential input shaft 234.

Circumferentially extending along at least a portion of the outer surface 248 of the differential pinion gear 246 is a plurality of differential pinion gear teeth 250. The plurality of differential pinion gear teeth 250 are complementary to and meshingly engaged with a plurality of ring gear teeth 252 circumferentially extending along at least a portion of an outer surface 254 of a differential ring gear 256 of the differential assembly 114. As a non-limiting example, the differential assembly 114 is a forward tandem axle differential assembly.

Disposed adjacent to an end of the second tapered roller bearing journal surface 182, opposite the increased diameter portion 150 of the input shaft, is a third plurality of axially extending input shaft splines 258. The third plurality of axially extending input shaft splines 258 are circumferentially extend along at least a portion of the outer surface 120 of the second end portion 124 of the input shaft 118.

Drivingly connected to the input shaft 118 is a spider 260 of an inter-axle differential assembly 261 having an inner surface 262 and an outer surface 264. Circumferentially extending along at least a portion of the inner surface 262 of the spider 260 is a plurality of axially extending spider splines 266. The plurality of axially extending spider splines 266 are complementary to and meshingly engaged with the third plurality of axially extending input shaft splines 258 on the outer surface 120 of the input shaft 118 of the axle system 100.

Rotationally and drivingly connected to at least a portion of the spider 260 of the inter-axle differential assembly 261 of the axle system 100 is one or more bevel pinion gears 268 having an outer surface 270 and a hollow interior portion 272. The hollow interior portion 272 of the one or more bevel pinion gears 268 is of a size and shape to receive and/or retain at least a portion of the spider 260. As a non-limiting example, the hollow interior portion 272 of the one or more bevel pinion gears 268 is substantially cylindrical in shape.

Circumferentially extending along at least a portion of the outer surface 270 of the one or more bevel pinion gears 268 is a plurality of bevel pinion gear teeth 274. The plurality of bevel pinion gear teeth 274 are complementary to and meshingly engaged with a second plurality of input helical side gear teeth 276 circumferentially extending along at least a portion of the second end portion 198 of the input helical side gear 168.

Extending co-axially with the input shaft 118 is a side gear 278 of the inter-axle differential assembly 261 having an inner surface 280, an outer surface 282, a first end portion 284, a second end portion 286 and an intermediate portion 288 interposed between the first and second end portion 284 and 286 of the input shaft 118. The inner surface 284 and the outer surface 286 of the side gear 278 defines a hollow portion 290 therein. As a non-limiting example, the hollow portion 290 of the side gear 278 is substantially cylindrical in shape.

An increased diameter portion 292 circumferentially extends along at least a portion of the outer surface 282 of the first end portion 284 of the side gear 278 of the axle system 100. The increased diameter portion 292 of the side gear 278 includes a plurality of side gear teeth 294 circumferentially extending along at least a portion of the outer surface 282 of the increased diameter portion 292 of the side gear 278. As best seen in FIG. 2 of the disclosure, the plurality of side gear teeth 294 are complementary to and meshingly engaged with the plurality of bevel pinion gear teeth 274 on the outer surface 270 of the one or more bevel pinion gears 268 of the axle system 100.

Disposed adjacent to an end of the third plurality of axially extending input shaft splines 258, opposite the second tapered roller bearing journal surface 182 of the input shaft 118, is a second reduced diameter portion 296. In accordance with the embodiment of the disclosure illustrated in FIGS. 2 and 3 of the disclosure and as a non-limiting example, at least a portion of the second reduced diameter portion 296 of the input shaft 118 is disposed within at least a portion of the hollow portion 290 of the side gear 278 of the axle system 100. As a result, at least a portion of the second reduced diameter portion 296 of the input shaft 118 has a size and shape to be received and/or retained within at least a portion of the hollow portion 290 of the side gear 278 of the inter-axle differential assembly 261 of the axle system 100.

As best seen in FIG. 3 of the disclosure and as a non-limiting example, the second reduced diameter portion 296 of the input shaft 118 has a diameter D7 that is less than the diameter D1 of the second tapered roller bearing journal surface 182 and the diameter D3 of the first tapered roller bearing journal surface 140 of the input shaft 118. Additionally, as best seen in FIG. 3 and as a non-limiting example, the diameter D7 of the second reduced diameter portion 296 of the input shaft 118 is substantially equal to a diameter D8 of the first reduced diameter portion 128 of the input shaft 118 of the axle system 100.

Circumferentially extending along at least a portion of the outer surface 120 of the second reduced diameter portion 296 of the input shaft 118 is an input shaft lubricant flow groove 298. According to the embodiment of the disclosure illustrated in FIGS. 2 and 3 and as a non-limiting example, the input shaft lubricant flow groove 298 is disposed directly adjacent to an end of the third plurality of axially extending input shaft splines 258 opposite the second tapered roller bearing journal surface 182 of the input shaft 118. The input shaft lubricant flow groove 298 of the input shaft 118 allows for the flow of an amount of lubricant fluid through the axle system 100 in order to ensure that the various components of the axle system 100 remain properly lubricated when in operation. In accordance with the embodiment of the disclosure illustrated in FIG. 3 and as a non-limiting example, the input shaft lubricant flow groove 298 has a diameter D9 that is less than the diameter D7 of the second reduced diameter portion 296 of the input shaft 188.

One or more apertures 300 extend from the inner surface 280 to the outer surface 282 of the side gear 278 of the inter-axle differential assembly 261. As illustrated in FIGS. 2 and 3 and as a non-limiting example, at least a portion of the one or more apertures 300 of the side gear 278 are disposed in the intermediate portion 288 of the side gear 278 of the inter-axle differential assembly 261. The one or more apertures 300 of the side gear 278 allow for the flow of an amount of lubricant fluid through the axle system 100 in order to ensure that the various components of the axle system 100 remain properly lubricated when in operation. In accordance with the embodiment of the disclosure illustrated in FIGS. 2 and 3 and as a non-limiting example, at least a portion of the second end portion 124 of the input shaft 118 extends beyond a centerline C1 of the one or more apertures 300 of the side gear 278 of the inter-axle differential assembly 261.

Extending co-axially with and drivingly connected to the side gear 278 is a shaft 302 having a first end portion 304, a second end portion (not shown) and an outer surface 306. At least a portion of the first end portion 304 of the shaft 302 is disposed within the hollow portion 290 of the side gear 278 of the inter-axle differential assembly 261. It is within the scope of this disclosure and as a non-limiting example, that the shaft 302 may be an intermediate shaft, a stub shaft, an inter-axle differential output shaft, a coupling shaft, a forward tandem axle system output shaft or a propeller shaft.

Circumferentially extending along at least a portion of the outer surface 306 of the first end portion 304 of the shaft 302 is a plurality of axially extending shaft splines 308. The plurality of axially extending shaft splines 308 are complementary to and meshingly engaged with a plurality of axially extending side gear splines 310 circumferentially extending along at least a portion of the inner surface 280 of the side gear 278.

In accordance with the embodiment of the disclosure illustrated in FIGS. 2 and 3 and as a non-limiting example, the input shaft 118 of the axle system 100 includes, in axial order, from the first end portion 122 to the second end portion 124 of the input shaft 118 the first reduced diameter portion 128, the first plurality of axially extending input shaft splines 130, the first tapered roller bearing journal surface 140, the increased diameter portion 150, the second tapered roller bearing journal surface 182, the third plurality of axially extending input shaft splines 258, the input shaft lubricant flow groove 298 and the second reduced diameter portion 296.

The input helical side gear 168 is retained and/or rotationally supported in its intended operating position along the input shaft 118 by the second tapered roller bearing 184 and the one or more bevel pinion gears 268 of the inter-axle differential assembly 261 of the axle system 100. As best seen in FIG. 3 of the disclosure, the plurality of bevel pinion gear teeth 274 on the outer surface 270 of the one or more bevel pinion gears 268 are disposed along one or more gear pitch lines 312 having an angle θ relative to a centerline C2 of the input shaft 118 of the axle system 100. When in operation, the axial forces experienced by the inter-axle differential 261 are larger than the radial forces experienced by the inter-axle differential 261. As a result, when in operation the second tapered roller bearing 184 is able to carry the radial and/or axial loads experienced by the input helical side gear 168. This allows the input helical side gear 168 to be retained and/or rotationally supported in its intended operation position along the input shaft 118, by just the second tapered roller bearing 184 and the angle θ of the one or more gear pitch lines 312 of the one or more bevel pinion gears 268 of the inter-axle differential 261 of the axle system 100. Because the radial and/or axial loads experienced by the input helical side gear 168 to be carried by a single bearing, e.g. the second tapered roller bearing 184, the axle system 100 disclosed herein eliminated the need of the one or more helical bushings and the thrust washer previously discussed. As a result, the axle system 100 disclosed herein is easier to manufacture, is easier to assemble, requires less parts, is lighter and is more cost efficient.

Figure 4:
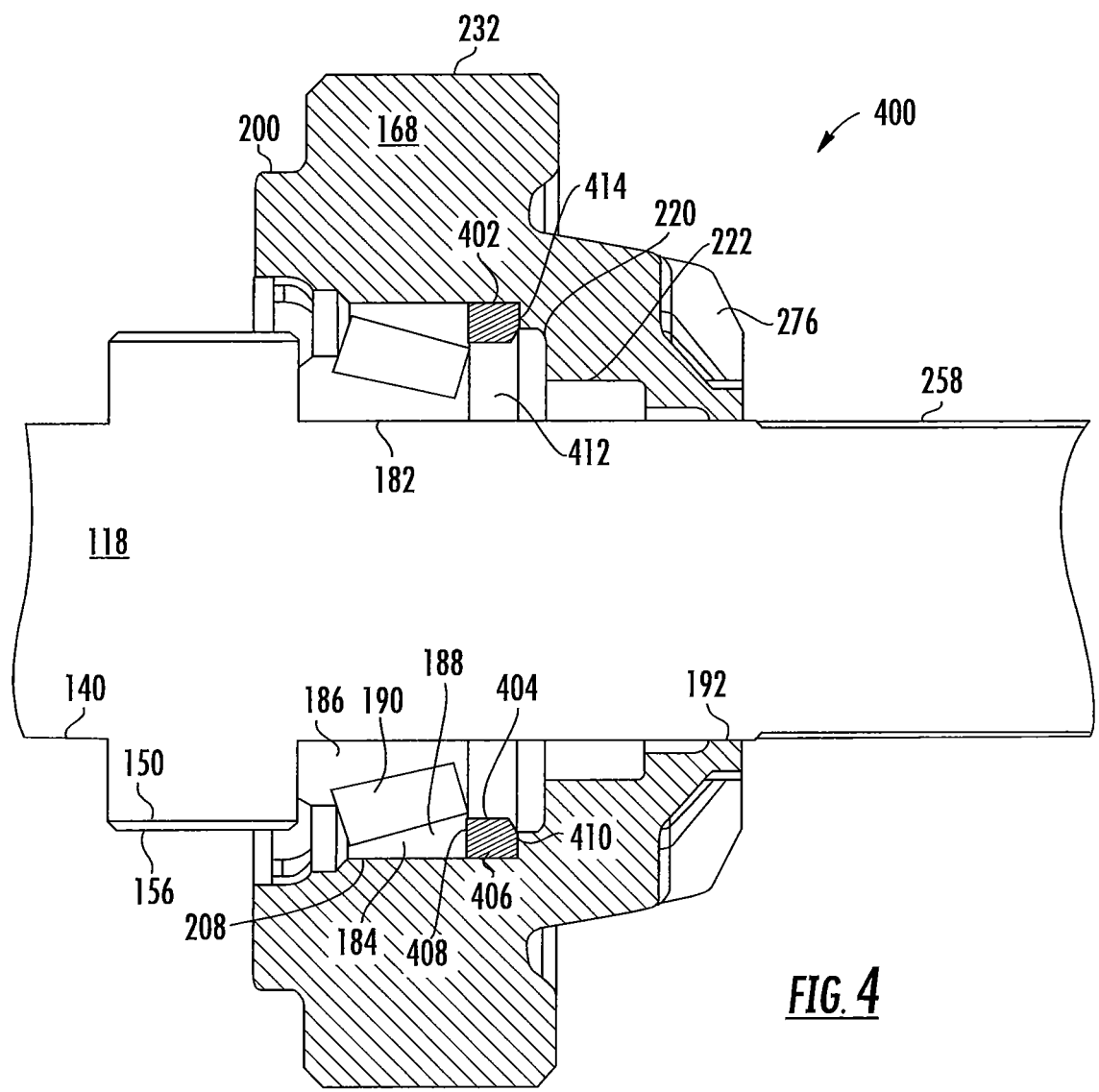
FIG. 4 is a cut-away schematic side-view of a portion of the axle system illustrated in FIGS. 2 and 3 according to an alternative embodiment of the disclosure.

FIG. 4 is a cut-away schematic side-view of a portion of the axle system 100 illustrated in FIGS. 2 and 3 according to an alternative embodiment of the disclosure. The portion of the axle system 400 illustrated in FIG. 4 is the same as the axle system 100 illustrated in FIGS. 2 and 3, except where specifically noted below. The axle system 400 illustrated in FIG. 4 includes the use of a bearing spacer 402 having an inner surface 404, an outer surface 406, a first end portion 408 and a second end portion 410. The inner surface 404 and the outer surface 406 of the bearing spacer 402 defines a hollow portion 412 therein. As illustrated in FIG. 4 of the disclosure, the bearing spacer 402 has a size and shape such that at least a portion of the bearing spacer 402 is received and/or retained within at least a portion of the tapered roller bearing receiving portion 208 in the inner surface 192 of the input helical side gear 168.

In accordance with the embodiment of the disclosure illustrated in FIG. 4 and as a non-limiting example, at least a portion of the first end portion 408 of the bearing spacer 402 is in direct contact with at least a portion of the outer race 188 of the second tapered roller bearing 284 of the axle system 400. Additionally, in accordance with the embodiment of the disclosure illustrated in FIG. 4 and as a non-limiting example, at least a portion of the second end portion 410 of the bearing spacer 402 is in direct contact with at least a portion of a wall portion 414 connecting the tapered roller bearing receiving portion 208 to the tapered roller bearing locator portion 220 in the inner surface 192 of the input helical side gear 118. As a result, at least a portion of the bearing spacer 402 is interposed between said second tapered roller bearing 184 and said tapered roller bearing locator portion 220 in said inner surface of said input helical side gear 168 of said axle system 400

It is within the scope of this disclosure and as a non-limiting example, that the bearing spacer 402 may be used in order to ensure that the second tapered roller bearing 184 is correctly assembled in its intended location to the input helical side gear 168 and the input shaft 118 of the axle system 400. Additionally, it is within the scope of this disclosure and as a non-limiting example, that the bearing spacer 402 illustrated in FIG. 4 may be used in order to reduce the overall amount of friction between the second tapered roller bearing 184 and the input helical side gear 168 by reducing the amount of surface area contact between the second tapered roller bearing 184 and the input helical side gear 168. By reducing the amount of friction between the second tapered roller bearing 184 and the input helical side gear 168, the overall efficiency of the axle system 400 can be increased.

Figure 5:
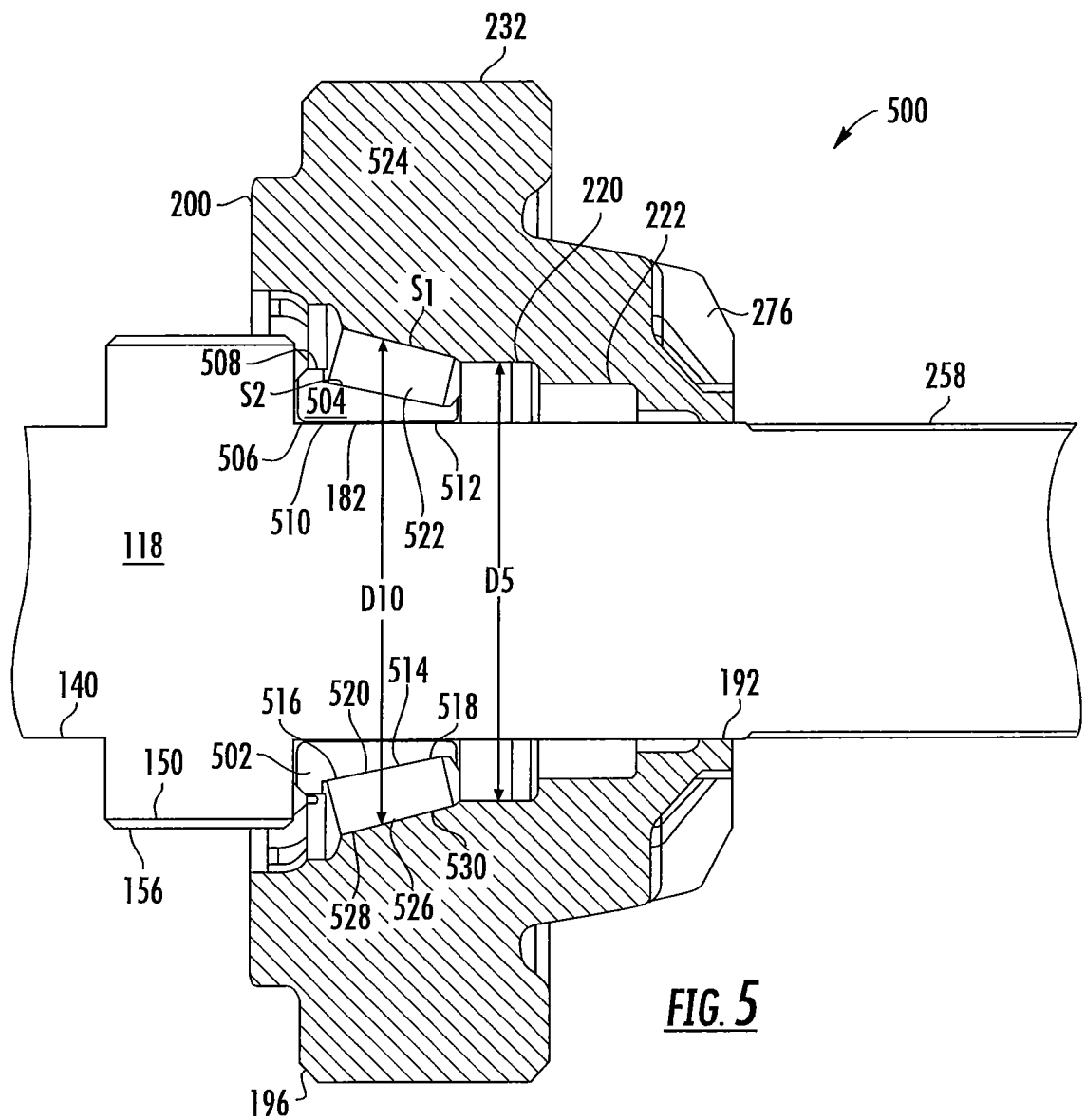
FIG. 5 is a cut-away schematic side-view of a portion of the axle systems illustrated in FIGS. 2-4 according to an alternative embodiment of the disclosure.

FIG. 5 is a cut-away schematic side-view of a portion of the axle systems illustrated in FIGS. 2-4 according to an alternative embodiment of the disclosure. The portion of the axle system 500 illustrated in FIG. 5 is the same as the axle assemblies 100 and 44 illustrated in FIGS. 2-4, except where noted below. In accordance with the embodiment of the disclosure illustrated in FIG. 5 and as a non-limiting example, the axle assembly 500 includes a second tapered roller bearing 502 that is disposed radially outboard from and extends co-axially with the input shaft 118 of the axle system 500. As illustrated in FIG. 5 of the disclosure, at least a portion of the second tapered roller bearing 502 is in direct contact with at least a portion of the second tapered roller bearing journal surface 182 of the input shaft 118.

According to the embodiment of the disclosure illustrated in FIG. 5, the second tapered roller bearing 502 includes an inner race 504 having an inner surface 506, an outer surface 508, a first end portion 510 and a second end portion 512. As illustrated in FIG. 5 of the disclosure at least a portion of the inner surface 506 of the inner race 504 of the second tapered roller bearing 502 is in direct contact with at least a portion of the second tapered roller bearing journal surface 182 of the input shaft 118. Additionally, as illustrated in FIG. 5 of the disclosure, at least a portion of the first end portion 510 of the inner race 504 of the second tapered roller bearing 502 of the axle system 500 is in direct contact with at least a portion of the second end portion 154 of the increased diameter portion 150 of the input shaft 118 of the axle system 500.

In accordance with the embodiment of the disclosure illustrated in FIG. 5, the outer surface 508 of the second tapered roller bearing 502 has a diameter that decreases from the first end portion 510 to the second end portion 512 of the inner race 504 of the second tapered roller bearing 502. Circumferentially extending along at least a portion of the outer surface 508 of the inner race 504 of the second tapered roller bearing 502 of the axle system 500 is one or more rolling element recesses 514 having a first end portion 516, a second end portion 518 and a bottom portion 520. As illustrated in FIG. 5 of the disclosure, the bottom portion 520 of the one or more rolling element recesses 514 have a diameter that decreases from the first end portion 516 to the second end portion 518 of the one or more rolling element recesses 514. The one or more rolling element recesses 514 are of a size and shape to receive and/or retain at least a portion of one or more of one or more rolling elements 522 of the second tapered roller bearing 502 of the axle system 500.

The input helical side gear 524 of the axle system 500 is the same as the input helical side gear 168 of the axle systems 100 and 400 illustrated in FIGS. 2-4, except where noted below. As illustrated in FIG. 5 of the disclosure, the input helical side gear 524 of the axle system 500 does not include the tapered roller bearing receiving portion 208 illustrated in FIGS. 2-4 of the disclosure. In accordance with the embodiment of the disclosure illustrated in FIG. 5 and as a non-limiting example, the input helical side gear 524 includes a tapered roller bearing surface 526 having a first end portion 528 and a second end portion 530. The tapered roller bearing surface 526 of the input helical side gear 524 circumferentially extends along at least a portion of the first end portion 196 of the inner surface 192 of the input helical side gear 524.

As illustrated in FIG. 5 of the disclosure, the tapered roller bearing surface 526 of the input helical side gear 524 has a diameter D10 that decreases from the first end portion 528 to the second end portion 530 of the tapered roller bearing surface 526. In accordance with the embodiment of the disclosure illustrated in FIG. 5 and as a non-limiting example, the tapered roller bearing surface 526 of the input helical side gear 524 has a slope S1 that is substantially equal to and is complementary to a slope S2 of the bottom portion 520 of the one or more rolling element recesses 514 of the inner race 504 of the second tapered roller bearing 502.

When assembled, the tapered roller bearing surface 526 of the input helical side gear 524 acts as the outer race of the second tapered roller bearing 502 of the axle system 500. As a result, when assembled, at least a portion of the tapered roller bearing surface 526 of the input helical side gear 524 is in direct contact with at least a portion of the one or more rolling elements 522 of the second tapered roller bearing 502. In accordance with the embodiment of the disclosure illustrated in FIG. 5, tapered roller bearing locator portion 220 in the inner surface 192 of the input helical side gear 524 ensures that the second tapered roller bearing 502 is assembled in the correct location in relation the input shaft 118 and the input helical side gear 524. Additionally, the tapered roller bearing locator portion 220 in the inner surface 192 of the input helical side gear 524 ensures that the second tapered roller bearing 502 remains in the correct location with respect to input shaft 118 and the input helical side gear 524 when in operation. In accordance with the embodiment of the disclosure illustrated in FIG. 5 and as a non-limiting example, at least a portion of the one or more rolling elements 522 of the second tapered roller bearing 502 are in direct contact with at least a portion of the tapered roller bearing locator portion 220 in the inner surface 192 of the input helical side gear 524 of the axle system 500.

Figure 6:
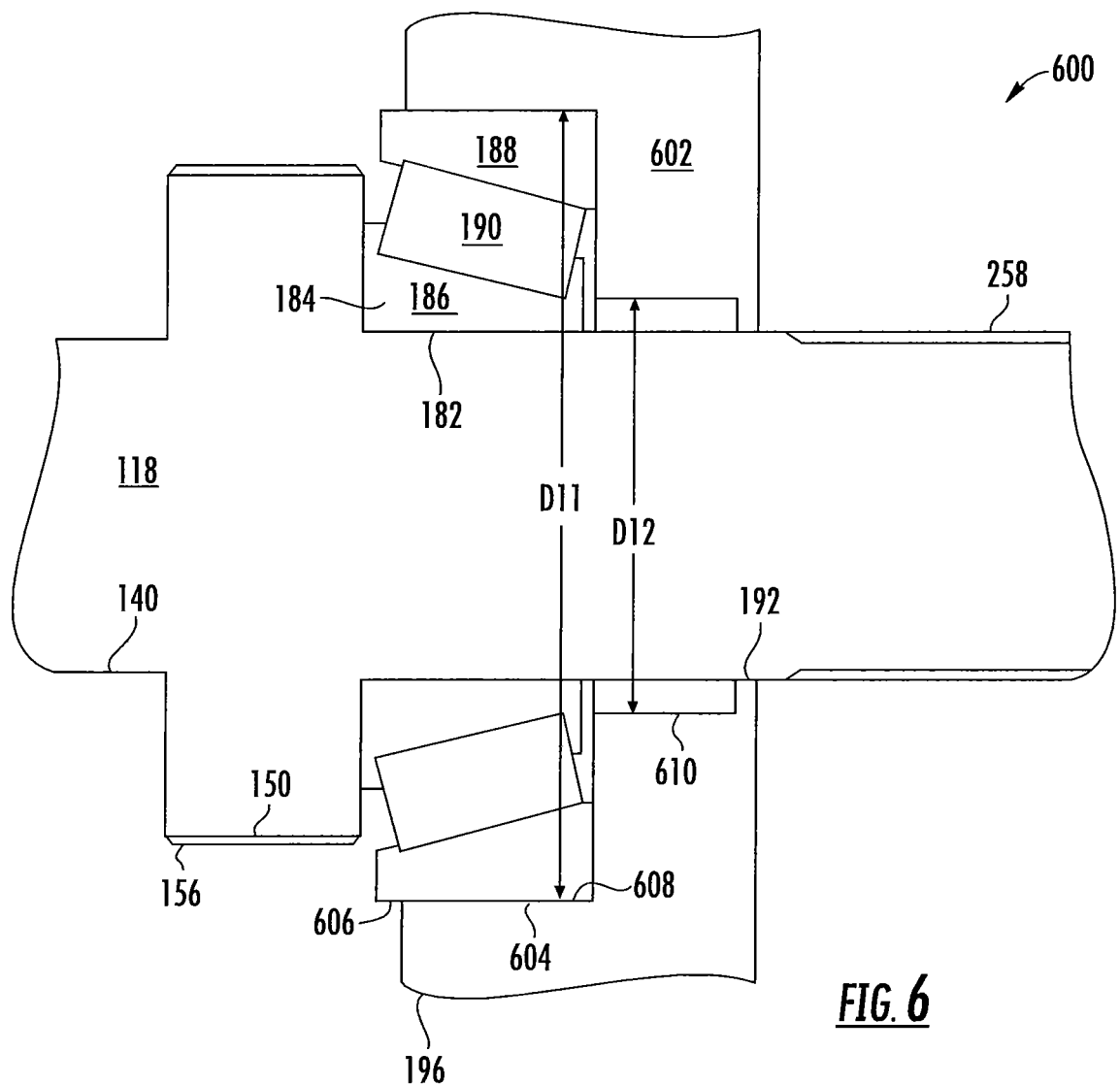
FIG. 6 is a cut-away schematic side-view of a portion of the axle systems illustrated in FIGS. 2-5 according to yet another embodiment of the disclosure.

FIG. 6 is a cut-away schematic side-view of a portion of the axle systems illustrated in FIGS. 2-5 according to yet another embodiment of the disclosure. The axle system 600 illustrated in FIG. 6 is the same as the axle systems 100, 400 and 500 illustrated in FIGS. 2-5, except where noted below. As illustrated in FIG. 6 of the disclosure, the axle system 600 includes an input helical side gear 602. In accordance with the embodiment of the disclosure illustrated in FIG. 6 and as a non-limiting example, the input helical side gear 602 does not include the tapered roller bearing locator portion 220 illustrated in FIGS. 2-5 of the disclosure.

As illustrated in FIG. 6 of the disclosure, the input helical side gear 602 includes a tapered roller bearing receiving portion 604 having a first end portion 606 and a second end portion 608. The tapered roller bearing receiving portion 604 of the input helical side gear 602 circumferentially extending along at least a portion of the first end portion 196 of the inner surface 192 of the input helical side gear 602. The tapered roller bearing receiving portion 604 of the input helical side hear 602 of the axle system 600 is of a size and shape to receive and/or retain at least a portion of the second tapered roller bearing 184 therein. As a result, the tapered roller bearing receiving portion 604 has a diameter D11 that is substantially equal to or slightly greater than an outer diameter of the outer race 188 of the second tapered roller bearing 184. In accordance with the embodiment of the disclosure illustrated in FIG. 6 and as a non-limiting example, at least a portion of the outer race 188 of the second tapered roller bearing 184 is in direct contact with at least a portion of the tapered roller bearing receiving portion 604 of the input helical side hear 602. As illustrated in FIG. 6 of the disclosure, the second tapered roller bearing 184 provides rotational support for at least a portion of the input helical side gear 602 and allows for relative rotation between the input shaft 118 and the input helical side gear 602 and the axle system 600.

Disposed directly adjacent to the second end portion 608 of the tapered roller bearing receiving portion 604 of the input helical side gear 602 is a lubricant flow portion 610. The lubricant flow portion 610 circumferentially extends along at least a portion of the inner surface 192 of the input helical side gear 602 of the axle system 600. The lubricant flow portion 610 of the input helical side gear 602 allows for the flow of an amount of lubricant fluid through the axle system 600 in order to ensure that the various components of the axle system 600 remain properly lubricated when in operation. In accordance with the embodiment of the disclosure illustrated in FIG. 6 and as a non-limiting example, the lubricant flow portion 610 in the inner surface 192 of the input helical side gear 602 has a diameter D12 that is less than the diameter D11 of the tapered roller bearing receiving portion 604 of the input helical side gear 602.

Figure 7:
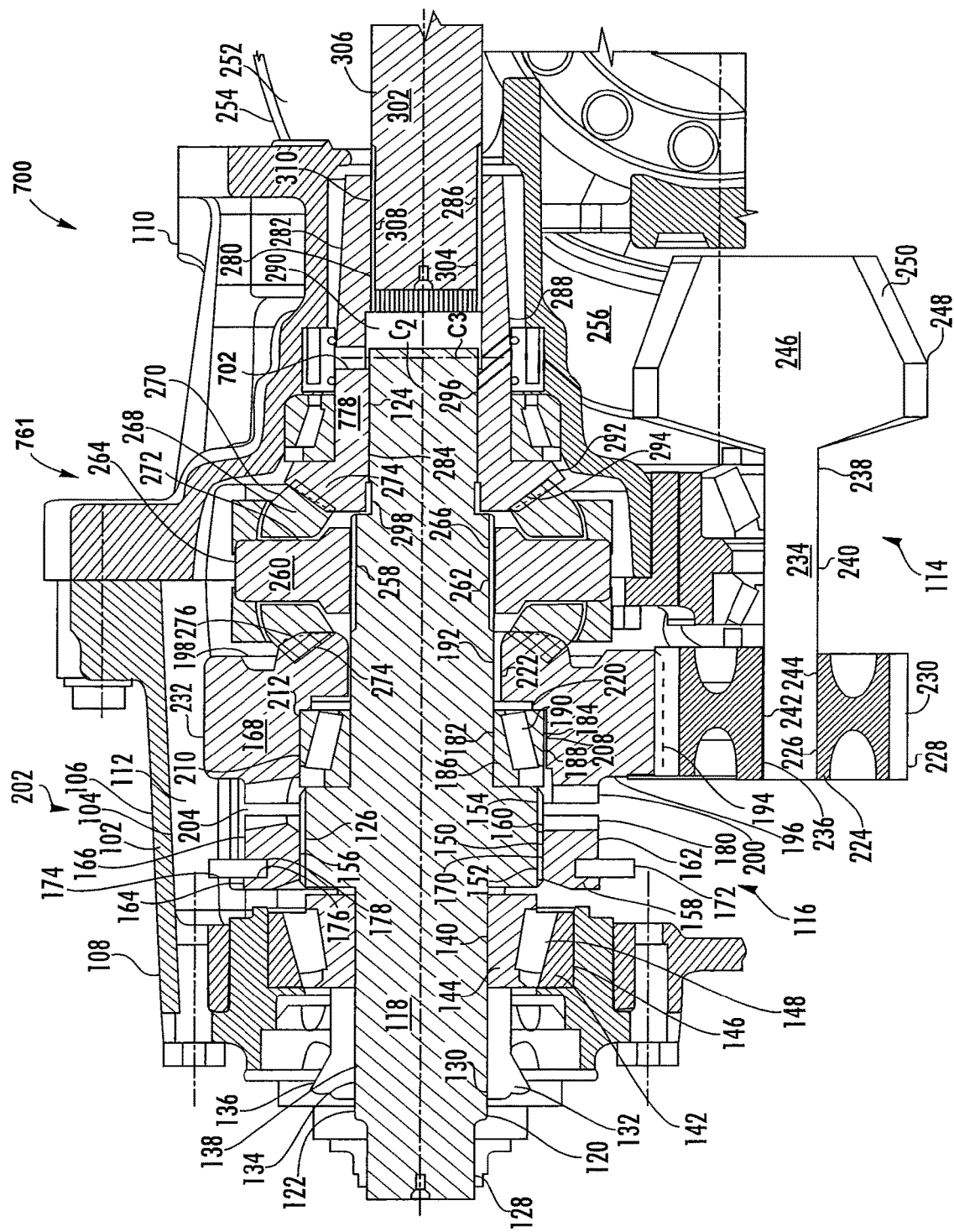
FIG. 7 is a cut-away schematic side-view of a portion of an axle system according to a further embodiment of the disclosure.

FIG. 7 is a cut-away schematic side-view of a portion of an axle system 700 according to a further embodiment of the disclosure. The axle system 700 illustrated in FIG. 7 is the same as the axle system 100 illustrated in FIGS. 1 and 2, except where specifically noted below. As illustrated in FIG. 7 of the disclosure and as a non-limiting example, the axle system 700 may include a side gear 778. In accordance with the embodiment illustrated in FIG. 7 of the disclosure and as a non-limiting example, the side gear 778 may include an aperture 702 therein extending from the inner surface 280 to the outer surface 282 of the side gear 778. At least a portion of the aperture 702 in the side gear 778 may be disposed within the intermediate portion 288 of the side gear 778 of an inter-axle differential assembly 761 of the axle system 700. The aperture 702 in the side gear 778 may allow for the flow of an amount of lubricant fluid through the axle system 700 in order to ensure that the various components of the axle system 700 remain properly lubricated when in operation. In accordance with the embodiment of the disclosure illustrated in FIG. 7 and as a non-limiting example, at least a portion of the second end portion 124 of the input shaft 118 may extend beyond a centerline C3 of the aperture 702 of the side gear 778 of the inter-axle differential assembly 761.

It is within the scope of this disclosure that the various embodiments of the disclosure described and illustrated herein may be combined with one another to make an axle system according to an embodiment of the disclosure.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. An axle system, comprising:
   an input shaft having an outer surface, a first end portion, a second end portion and an intermediate portion interposed between said first and second end portions of said input shaft;
   wherein said input shaft has an increased diameter portion circumferentially extending from at least a portion of said intermediate portion of said input shaft;
   a bearing disposed radially outboard from and is in direct contact with a bearing journal surface that is disposed adjacent to a first end portion of said increased diameter portion of said input shaft;
   a tapered roller bearing disposed radially outboard from and is in direct contact with a tapered roller bearing journal surface that is disposed adjacent to a second end portion of said increased diameter portion of said input shaft;
   an input helical side gear having a first end portion, a second end portion, an inner surface and an outer surface;
   wherein a tapered roller bearing receiving portion circumferentially extends along at least a portion of said first end portion of said inner surface of said input helical side gear;
   wherein at least a portion of said tapered roller bearing is disposed within said tapered roller bearing receiving portion in said inner surface of said input helical side gear;
   wherein a lubricant flow portion circumferentially extends along at least a portion of said inner surface of said input helical side gear at a location near an end of a tapered roller bearing locator portion in said inner surface of said input helical side gear opposite said tapered roller bearing receiving portion; and
   wherein said tapered roller bearing locator portion of said input helical side gear is disposed near and has a diameter that is less than said tapered roller bearing receiving portion in said input helical side gear.

2. The axle system of claim 1, wherein said input shaft further comprises a first plurality of axially extending input shaft splines, a second plurality of axially extending input shaft splines and a third plurality of axially extending input shaft splines;
   wherein said first, second and third plurality of axially extending input shaft splines circumferentially extend along at least a portion of said outer surface of said input shaft; and
   wherein said second plurality of axially extending input shaft splines circumferentially extend along at least a portion of an outer surface of said increased diameter portion of said input shaft.

3. The axle system of claim 2, wherein said input shaft further comprises a first reduced diameter portion and a second reduced diameter portion.

4. The axle system of claim 3, wherein said input shaft includes, in axial order from said first end portion to said second end portion of said input shaft, said first reduced diameter portion, said first plurality of axially extending input shaft splines, said bearing journal surface, said increased diameter portion, said tapered roller bearing journal surface, said third plurality of axially extending input shaft splines and said second reduced diameter portion.

5. The axle system of claim 2, further comprising an axle disconnect collar having an inner surface, an outer surface, a first end portion and a second end portion;
   wherein a plurality of axially extending axle disconnect collar splines circumferentially extend along at least a portion of said inner surface of said axle disconnect collar; and
   wherein said plurality of axially extending axle disconnect splines are complementary to and meshingly engaged with said second plurality of axially extending input shaft splines on said outer surface of said increased diameter portion of said input shaft;
   wherein a plurality of axle disconnect collar clutch teeth circumferentially extend axially outboard from at least a portion of said second end portion of said axle disconnect collar; and
   wherein said plurality of axle disconnect collar clutch teeth are complementary to and selectively engageable with a plurality of input helical side gear clutch teeth circumferentially extending axially outboard from at least a portion of said first end portion of said input helical side gear.

6. The axle system of claim 2, further comprising a spider and a plurality of bevel pinion gears;
   wherein a plurality of axially extending spider splines circumferentially extend along at least a portion of an inner surface of said spider;
   wherein said plurality of axially extending spider splines are complementary to and meshingly engaged with said third plurality of axially extending input shaft splines on said outer surface of said input shaft;
   wherein said plurality of bevel pinion gears have a hollow interior portion;
   wherein at least a portion of said spider is received and/or retained within at least a portion of said hollow interior portion of said plurality of bevel pinion gears;
   wherein a plurality of bevel pinion gear teeth circumferentially extend along at least a portion of an outer surface of said plurality of bevel pinion gears; and wherein said plurality of bevel pinion gear teeth are complementary to and meshingly engaged with a plurality of input helical side gear teeth circumferentially extending along at least a portion of said second end portion of said input helical side gear.

7. The axle system of claim 6, further comprising, a side gear having an inner surface, an outer surface, a first end portion, a second end portion and an intermediate portion interposed between said first and second end portions of said side gear;
   wherein said first end portion of said side gear has an increased diameter portion;
   wherein a plurality of side gear teeth circumferentially extending from said outer surface of said increased diameter portion of said side gear;
   wherein said plurality of side gear teeth are complementary to and meshingly engaged with said plurality of bevel pinion gear teeth on said outer surface of said plurality of bevel pinion gears;
   wherein one or more apertures extend from said inner surface to said outer surface of said intermediate portion of said side gear;
   wherein a plurality of axially extending side gear splines circumferentially extend along at least a portion of said inner surface of said side gear; and
   wherein said plurality of axially extending side gear splines are complementary to and meshingly engaged with a plurality of shaft splines circumferentially extending along at least a portion of a first end portion of a shaft.

8. The axle system of claim 7, wherein said one or more apertures in said intermediate portion of said side gear have a centerline C1; and
   wherein at least a portion of said second end portion of said input shaft extends axially beyond said centerline C1 of said one or more apertures in said intermediate portion of said side gear.

9. The axle system of claim 1, wherein said tapered roller bearing journal surface has a diameter that is larger than a diameter of said bearing journal surface of said input shaft.

10. The axle system of claim 1, further comprising a bearing spacer;
    wherein at least a portion of said bearing spacer is disposed within said tapered roller bearing receiving portion in said inner surface of said input helical side gear; and
    wherein at least a portion of said bearing spacer is interposed between said tapered roller bearing locator portion in said inner surface of said input helical side gear and said tapered roller bearing.

11. The axle system of claim of claim 1, wherein said lubricant flow portion in said inner surface of said input helical side gear has a diameter that is less than said diameter of said tapered roller bearing locator portion in said inner surface of said input helical side gear.

12. The axle system of claim 1, wherein said input shaft is an inter-axle differential input shaft.

13. The axle system of claim 1, wherein said bearing is a second tapered roller bearing.

14. An input helical side gear, comprising:
    a plurality of input helical side gear clutch teeth circumferentially extend axially outboard from at least a portion of a first end portion of said input helical side gear;
    a first plurality of input helical side gear teeth circumferentially extend from at least a portion of an outer surface of said input helical side gear;
    a second plurality of input helical side gear teeth circumferentially extend axially outboard from at least a portion of a second end portion of said input helical side gear;
    a tapered roller bearing receiving portion circumferentially extends along at least a portion of said first end portion of an inner surface of said input helical side gear; and
    a lubricant flow portion circumferentially extends along at least a portion of said inner surface of said input helical side gear at a location near an end of a tapered roller bearing locator portion in said inner surface of said input helical side gear opposite said tapered roller bearing receiving portion;
    wherein said lubricant flow portion in said inner surface of said input helical side gear has a diameter that is less than a diameter of said tapered roller bearing locator portion in said inner surface of said input helical side gear.

15. The input helical side gear of claim 14, wherein said tapered roller bearing receiving portion has a tapered roller bearing surface having a diameter that decreases from a first end portion to a second end portion of said tapered roller bearing surface.

16. The input helical side gear of claim 15, wherein said diameter of said tapered roller bearing surface decreases from said first end portion to said second end portion of said tapered roller bearing surface at a substantially constant rate.

17. The input helical side gear of claim 14, wherein said tapered roller bearing locator portion circumferentially extends along at least a portion of said inner surface of said input helical side gear; and
    wherein said tapered roller bearing locator portion of said input helical side gear has said diameter that is less than said tapered roller bearing receiving portion in said input helical side gear.

* * * * *